W. C. FORD.
DISK PLOW.
APPLICATION FILED NOV. 9, 1914.
1,225,233.
Patented May 8, 1917.
2 SHEETS—SHEET 1.
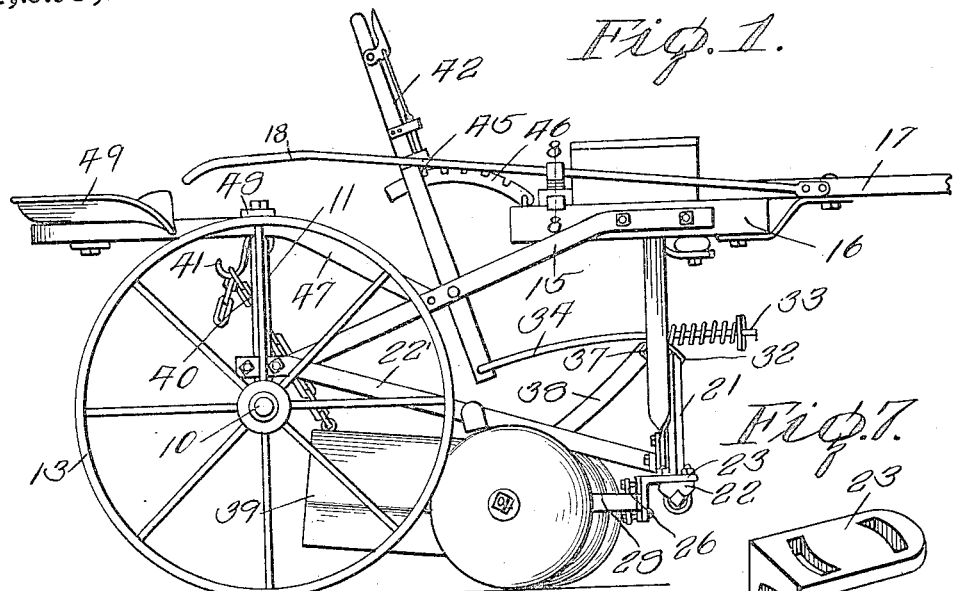
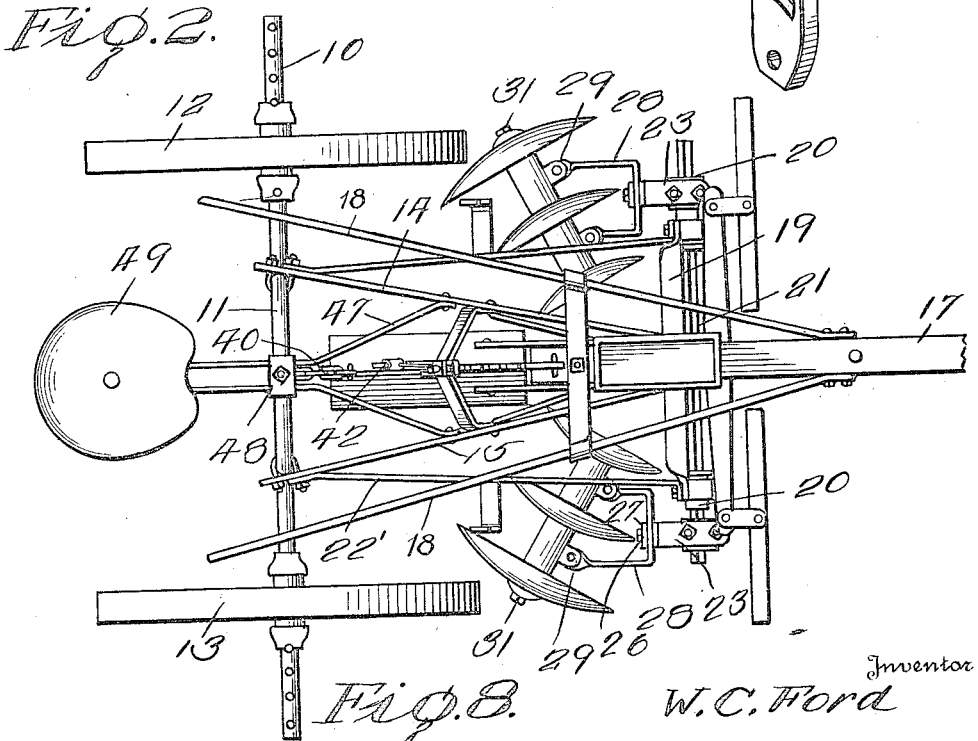
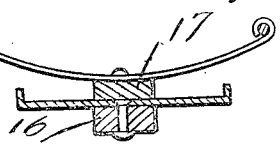
Inventor
W. C. Ford
Witnesses

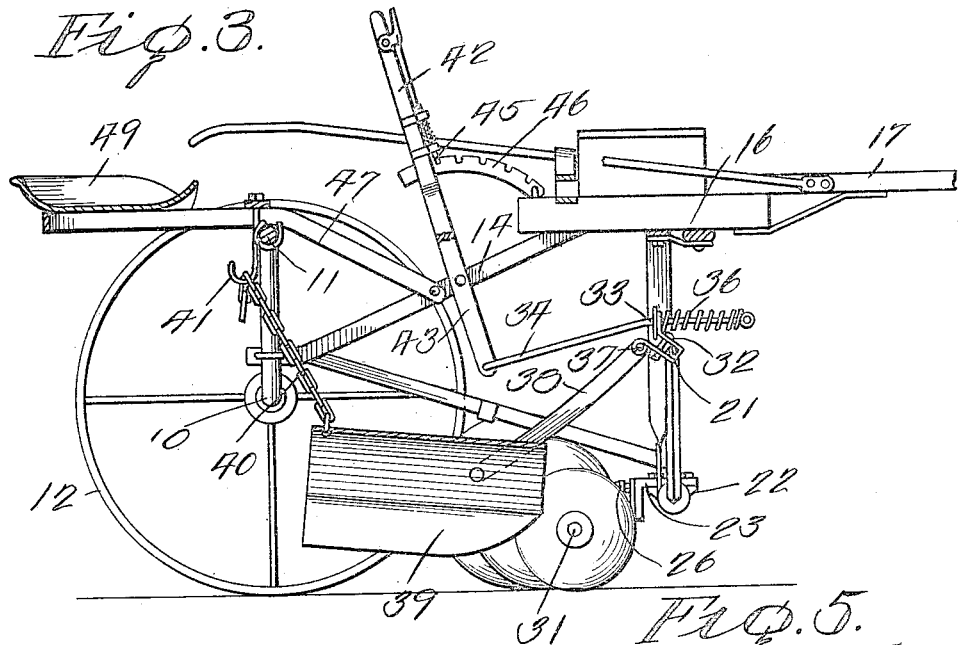
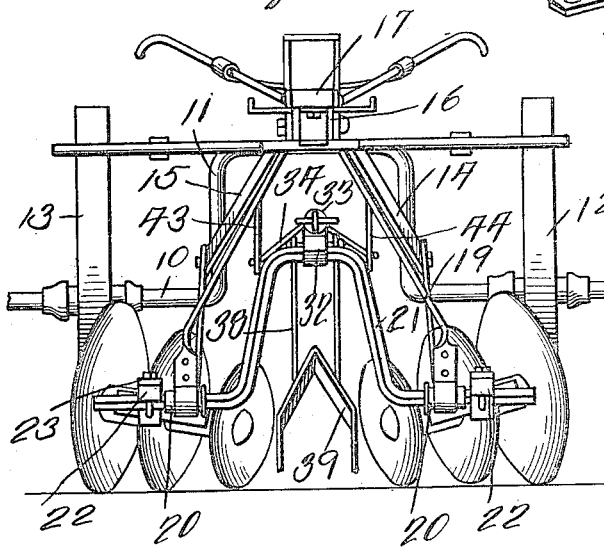

UNITED STATES PATENT OFFICE.

WALTER C. FORD, OF ERICK, OKLAHOMA.

DISK PLOW.

1,225,233.   Specification of Letters Patent.   Patented May 8, 1917.

Application filed November 9, 1914. Serial No. 871,128.

*To all whom it may concern:*

Be it known that I, WALTER C. FORD, a citizen of the United States, residing at Erick, in the county of Beckham, State of Oklahoma, have invented certain new and useful Improvements in Disk Plows, and I do hereby declare the following to be a full, clear, and exact description of the invention, such as will enable others skilled in the art to which it appertains, to make and use the same.

This invention relates to disk plows.

The object of the invention resides in the provision of a disk plow embodying an improved construction, whereby the cultivator disks and the traction wheels may be adjusted relatively so that the latter will always travel in the furrow formed by the disk in advance thereof.

A further object of the invention resides in the provision of a disk plow embodying an improved construction for yieldingly holding the disks in engagement with the ground so that when the disks are brought into engagement with a relatively hard substance, such as stones, or rocks, they will give and ride over same.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which:

Figure 1 is a side view of a disk plow constructed in accordance with the invention, Fig. 2, is a plan view of same, Fig. 3, a longitudinal section of the plow, Fig. 4, a front view of the plow, Fig. 5, a detail perspective view showing the disk mounting, Fig. 6, a longitudinal section of what is shown in Fig. 5, Fig. 7, a perspective view of the L-shaped member employed in the clamp.

Fig. 8, a section on the line 8—8 of Fig. 1.

Referring to the drawings, the improved disk plow is shown as comprising an axle 10 including a central arch portion 11. Adjustably fixed on the axle 10 are traction wheels 12 and 13. Secured to the axle 10 against respective sides of the arch 11 are forwardly extending tongue straps 14 and 15, between the forward ends of which is secured a block 16 and pivotally mounted upon this block is a draft tongue 17. Secured to the tongue 17 are rearwardly extending handles 18. Secured against the underside of the block 16 is the upper portion of an arch 19, the terminals of which carry bearings 20 in which is rotatably mounted a disk arch 21. The arch 19 is strengthened by braces 22' connecting same with respective tongue straps 14 and 15. Adjustably mounted on each end of the arch 21 is a clamp or clip 22, including an L-shaped plate 23, one arm of which is disposed upon the top of the clamp while the other arm thereof depends. Extending through the depending arm of each plate 23 are bolts 24 and 25, the opening in the depending arm through which the bolt 24 extends being extended laterally. Mounted on the bolts 24 and 25 are clamping plates 26 and 27, and secured between the plates 26 and 27 is the arm connecting portion of a substantially U-shaped bracket 28. Mounted upon the arms of each bracket 28 by means of clips 29 is a disk axle 30 and rotatably mounted upon this axle is a disk gang 31. By this construction it will be obvious that the clip or clamp 22 can be adjusted on the arch 21 and also that the bracket 28 can be adjusted transversely of the machine. By this adjustment the disk gang 31 can be readily brought into a position just forward of the adjacent traction wheel so that the latter will travel in the furrow formed by the outer disk of the gang.

Fixed upon the upper portion of the arch 21 is a bracket 32, in which is slidably mounted for movement longitudinally of the machine the stem 33 of a Y-shaped member 34, a nut 35 is threaded on the forward end of the stem 33 and a spring 36 encircles said stem and bears at one end against the nut 35 and at its other end against the bracket 32. Carried by the bracket 32 is a transverse member 37 and pivoted on this member 37 are arms 38 which have secured to their free ends a shield 39. Secured to the rear end of the shield 39 is one end of a chain 40 which is adapted to be engaged over a hook 41 to raise and lower the rear end of the shield. The arch 21 is adapted to be rotated to raise and lower the disks 31 and also to raise and lower the shield 39 by means of an operating lever 42 having its lower end forked to form arms 43 and 44 which are pivotally connected to the tongue straps 14 and 15 and also connected respectively to the arms of the Y-shaped member 34.

In the event the disks 31 engage a relatively hard substance it will be apparent that the arch 21 can rotate independent of the operation of the lever 42. During rotation of the arch 21 independent of the lever 42 the spring 36 will be compressed and as soon as the disks 31 have passed over the relatively hard substance they will be returned into proper engagement with the ground by said spring.

The operating lever 42 carries a spring pawl 45 which coöperates with a toothed member 46 secured to the block 16 and thereby said lever is locked in a desired adjustment.

Secured to the straps 14 and 15 respectively are corresponding ends of braces 47 which are held against the arch 11 by means of a clip 48 and have mounted on their extreme rear end in an adjustable manner an operator's seat 49.

What is claimed is:

A disk plow comprising a wheeled axle, a frame supported by said axle, a disk arch pivoted on said frame, clamps secured to respective ends of the disk arch, each of said clamps embodying a block and a U-shaped member embracing the arch and having its arms extending through passages in the block, an L-shaped member having one arm bearing upon and provided with openings through which the arms of the clip extend, the other arm of the L-shaped member extending downwardly and provided with an upper arcuate slot and a lower opening, bolts engaged through the slots and opening respectively, a plate engaged on said bolts, a U-shaped member secured between the plate and the adjacent arm of the L-shaped member, an axle mounted on the U-shaped member, and a disk gang mounted on the axle.

In testimony whereof, I affix my signature, in the presence of two witnesses.

WALTER C. FORD.

Witnesses:
D. F. SIDES,
HOMER B. STAGGS.

Copies of this patent may be obtained for five cents each, by addressing the "Commissioner of Patents, Washington, D. C."